Nov. 28, 1944.　　A. J. LOEPSINGER　　2,363,538

SPRING SUPPORT

Filed Sept. 30, 1943

Albert J. Loepsinger,
Inventor:
by Harry Dexter Peck
Attorney

Patented Nov. 28, 1944

2,363,538

UNITED STATES PATENT OFFICE 2,363,538

SPRING SUPPORT

Albert J. Loepsinger, Providence, R. I., assignor to Grinnell Corporation, Providence, R. I., a corporation of Delaware Application September 30, 1943, Serial No. 504,508

4 Claims. (Cl. 248—54)

This invention relates to improvements in spring supports. More especially it has to do with dampening means incorporated in such a support.

When a load which is yieldingly supported becomes subject to a vibratory influence, the load will take on a vibrating motion having a frequency corresponding to that of the actuating influence. If the yieldable support is provided by a spring the motion of the load set up by the vibration will be enhanced if the frequency of the vibrations is the same as the frequency of the loaded spring. When this occurs, the excessive reciprocating movement of the load may cause serious damage and if permitted to continue may result in fatigue failure of otherwise sufficiently strong elements. Such a condition of enhanced vibration could be corrected by changing the spring to one of a different natural frequency, but this is not always a convenient change to make and in any event may prove to be a relief for only a particular condition because if the frequency of the vibrating influence should change to that of the substituted spring, the situation would then be no better than previously corrected.

It is an object of the present invention to provide in a spring support adjustable means to give opposed frequencies when the load moves from one side to the other of its normal position. This enables the support to be installed where it is not known at the outset what vibrating influences on the load may later be developed. Indeed, the support might initially be installed without my dampening means and thereafter in case a synchronous condition should develop such means could readily be added to the installed support. Because the improved support provides opposed frequencies it completely avoids the undesired synchronous situation which is so dangerous.

The best modes in which I have contemplated apply the principles of my invention are shown in the accompanying drawing but these are to be taken as merely illustrative because it is intended that the patent will cover by suitable expression in the appended claims whatever features of patentable novelty exist in the invention disclosed.

Figure 1:
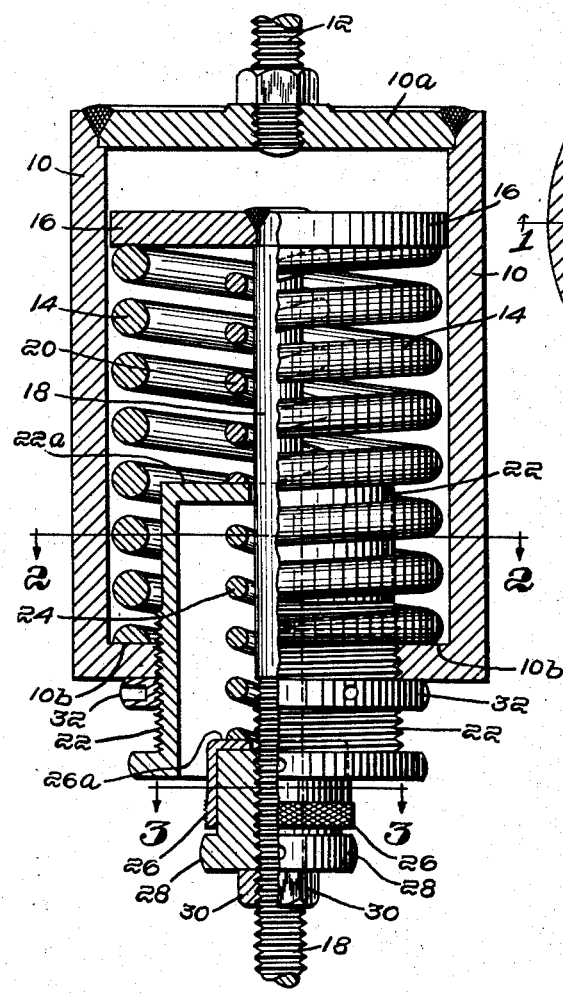
Figure 1 is a partial section, taken as on line 1—1 of Figure 2, showing a spring support embodying my invention.
Figure 2:
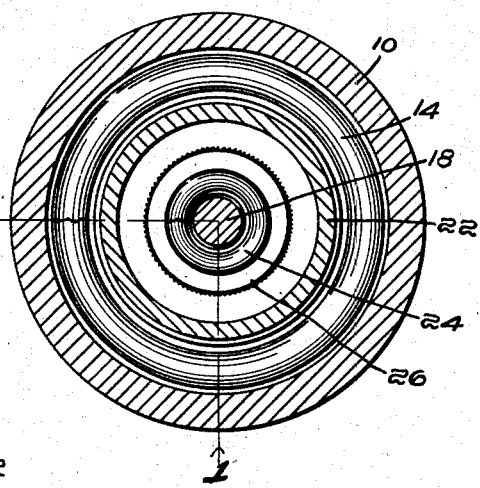
Figure 2 is a section as on line 2—2 of Figure 1.
Figure 3:
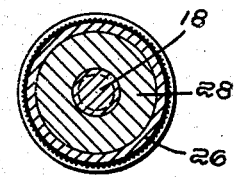
Figure 3 is a section as on line 3—3 of Figure 1.

Referring to the drawing and especially to Figure 1, my improvements may be applied to an ordinary spring support having a casing 10 which can be connected to some suitable support via a tie member 12 attached to the top 10a of the casing. This top may be welded or otherwise secured to the body of the casing. At the bottom of the casing is an inturned annular flange 10b which constitutes a seat for the bottom end of a load spring 14. The upper end of this spring rests against a plate 16 from whose center depends a tie rod 18 which is suitably connected with the load to be supported.

With such a support, as thus far described, the load spring has a frequency depending upon the spring constant and the weight of the load. If the load should be subjected to a vibratory influence having also a frequency like that of the loaded spring, a synchronous condition would occur which would cause the load to vibrate, that is, move upward and downward excessively. If this condition were to continue the extent of movement of the load would become so great as to rupture some otherwise sufficiently strong element. For example if the load were a pipe carrying superheated steam at a high pressure, and this pipe were subjected to a vibratory influence whose frequency was the same as that of the loaded spring, the pipe would move increasing amounts until it or some fitting gave way. This would liberate the steam and produce a situation of grave danger.

To avoid such a synchronous condition I propose to apply to the ordinary spring support, thus far described, a pair of auxiliary springs which will provide, in the support as a whole, opposed frequencies which together can never be brought into a synchronous condition with that of any vibratory influence.

If the support thus far described has been in use in the field, it can be temporarily removed and my dampening means applied thereto. A spring 20, an adjusting sleeve 22, another spring 24, and a feeler sleeve 26 are slipped onto the extended end of the rod 18. This rod is preferably threaded as is also a collar 28 so that the latter can be screwed along the rod, behind the other parts just enumerated.

The casing should be held fixed and a load imposed on the rod 18 equivalent to the load carried by the support. This will depress the spring 14 and move the plate 16 to the position it normally occupies when the support is in use. The adjusting sleeve 22 has a top inturned flange 22a upon which the upper spring 20 seats and against which the lower spring 24 may be imposed. The sleeve 22 is screwed into the casing 10 (there being threads on the sleeve and threads on the inner edge of the flange 10b for this purpose) until the inner spring 20 just makes contact with the plate 16. The collar 28 is then screwed along the rod 18 until the outer spring 24, which seats on an inturned flange 26a of the feeler sleeve 26, engages the inturned flange 22a of the adjusting sleeve 22. The collar 28 can then be locked in position by a nut 30, or otherwise suitably secured to the rod 18.

When the collar has been secured to the rod in one way or another, the support can be reinstalled in its place and the load applied. Thereafter the adjusting sleeve 22 can be screwed in or out to adjust the sleeve so that its inturned flange 22a will be just barely in contact, or very nearly so, with the upper end of spring 24. This is readily determined by the ease with which the feeler sleeve 26 can be turned by hand, and if the upper spring 20 has been properly selected as to length, it will also be just barely in contact, or nearly so, with the plate 16 and the flange 22a of the adjusting sleeve. When the latter sleeve is properly positioned it can be secured in place by a lock nut 32.

If now the load is subjected to a vibratory influence which tends to move it up and down, the two auxiliary springs at once become active. When the load moves upward, the lower spring 24 is compressed and acts against this upward movement. Likewise when the load moves downward below its normal position the spring 20 becomes compressed and acts against this downward movement. In short, regardless of which way the load moves, it at once becomes subject to the combined action of two springs, that is, the load spring and one of the two auxiliary springs. Thus the frequency of the support shifts from that of one pair of springs to that of the other pair, the load spring of course being common to both pairs. Since the frequency when one pair of springs is acting is different from that when the other pair is acting, any vibratory influence having a frequency equal to that of either pair will not be able to set up any excessive vibrations of the load because of the change in frequency due to the other pair of springs.

Although the drawing shows the auxiliary springs 20 and 24 as similar to one another they need not be identical. Indeed it may prove desirable to use auxiliary springs having different spring constants.

I claim:

1. A spring support comprising a load spring for supporting a load in its normal position and permitting said load to move above and below said position; resilient means acting to resist movement of the load only above its normal position; other resilient means acting to resist movement of the load only below its normal position; an adjustable seat interposed between said resilient means; and means for adjusting the said seat to avoid action of both resilient means when the load is being supported in its normal position.

2. A spring support comprising a casing connected to a support and having a seat for a load spring; a load spring resting on said seat; an element resting on said load spring and connected to the load; an auxiliary spring engaging said element; a second auxiliary spring engaging said element; an adjustable stop interposed between said auxiliary springs; and means for adjusting said stop; the said load spring acting alone on said load when the latter is in its normal position and the said stop being adjusted to cause one of the auxiliary springs to act on said load to resist movement thereof only when the load moves away from its normal position.

3. A spring support having a casing connected with a support; an element connected to and movable with a load; a load spring interposed between the casing and the element and adapted to support the load in its normal position and permit movement therefrom in opposite directions; auxiliary springs arranged to act on the element and oppose movement of the load in both directions away from its normal position; and means adjustable from outside said casing for determining the point at which the said opposition of the auxiliary springs becomes effective.

4. A spring support comprising a load spring arranged to support a load in a normal position and to permit movement of the load above and below said position; auxiliary springs arranged to oppose movement of said load away from said position; an adjustable stop for said auxiliary springs; and means for adjusting said stop to render said auxiliary springs inactive when the load is in the said normal position.

ALBERT J. LOEPSINGER.